US010612972B2

(12) United States Patent
Clemens et al.

(10) Patent No.: US 10,612,972 B2
(45) Date of Patent: Apr. 7, 2020

(54) LIGHT RECEIVER AND METHOD FOR READING OUT AVALANCHE PHOTODIODES IN GEIGER MODE

(71) Applicant: SICK AG, Waldkirch (DE)

(72) Inventors: Klaus Clemens, Waldkirch (DE); Gottfried Hug, Waldkirch (DE); Stefan Seitz, Waldkirch (DE)

(73) Assignee: SICK AG, Waldkirch (DE)

( * ) Notice: Subject to any disclaimer, the term of this patent is extended or adjusted under 35 U.S.C. 154(b) by 171 days.

(21) Appl. No.: 15/846,296

(22) Filed: Dec. 19, 2017

(65) Prior Publication Data

US 2018/0180472 A1    Jun. 28, 2018

(30) Foreign Application Priority Data

Dec. 22, 2016    (EP) .................................... 16206060

(51) Int. Cl.
*G01J 1/44* (2006.01)
*G01S 7/4861* (2020.01)
(Continued)

(52) U.S. Cl.
CPC ............... *G01J 1/44* (2013.01); *G01S 7/4816* (2013.01); *G01S 7/4861* (2013.01); *G01S 7/4863* (2013.01); *G01S 17/08* (2013.01); *G01J 2001/4238* (2013.01); *G01J 2001/442* (2013.01); *G01J 2001/4466* (2013.01); *G01S 7/4868* (2013.01); *G01S 17/89* (2013.01);
(Continued)

(58) Field of Classification Search
CPC ..................... G01J 2001/442; G01J 2001/4466
See application file for complete search history.

(56) References Cited

U.S. PATENT DOCUMENTS 8,188,418 B1    5/2012   Kondratko et al.
2007/0182949 A1*  8/2007   Niclass ..................... G01C 3/08
                                                        356/3

FOREIGN PATENT DOCUMENTS

EP        2728373 A1    5/2014
KR     101381392 B1    4/2014
(Continued)

OTHER PUBLICATIONS

A.Sadigov, et al. "A micropixel avalanche Phototransistor for time of flight measurements", The 14th Vienna Conference on Instrumentation, 2016.
(Continued)

*Primary Examiner* — Thanh Luu
(74) *Attorney, Agent, or Firm* — Nath, Goldberg & Meyer; Jerald L. Meyer

(57) ABSTRACT

A light receiver (100), comprising:
a plurality of avalanche photodiode elements (10) each being biased with a bias voltage above a breakdown voltage and thus operated in a Geiger mode in order to trigger a Geiger current upon light reception
and a plurality of readout circuits (42, 44, 46) associated with individual avalanche photodiode elements (10) or a group of avalanche photodiode elements (10) for reading out a Geiger current generated upon light reception,
wherein the readout circuits (42, 44, 46) each comprise a measurement path (42) and a blanking path (46) as well as a switching element (44) for selectively supplying the Geiger current, or a measurement current corresponding to the Geiger current, to the measurement path (42) or the blanking path (46).

21 Claims, 5 Drawing Sheets

Figure 1:
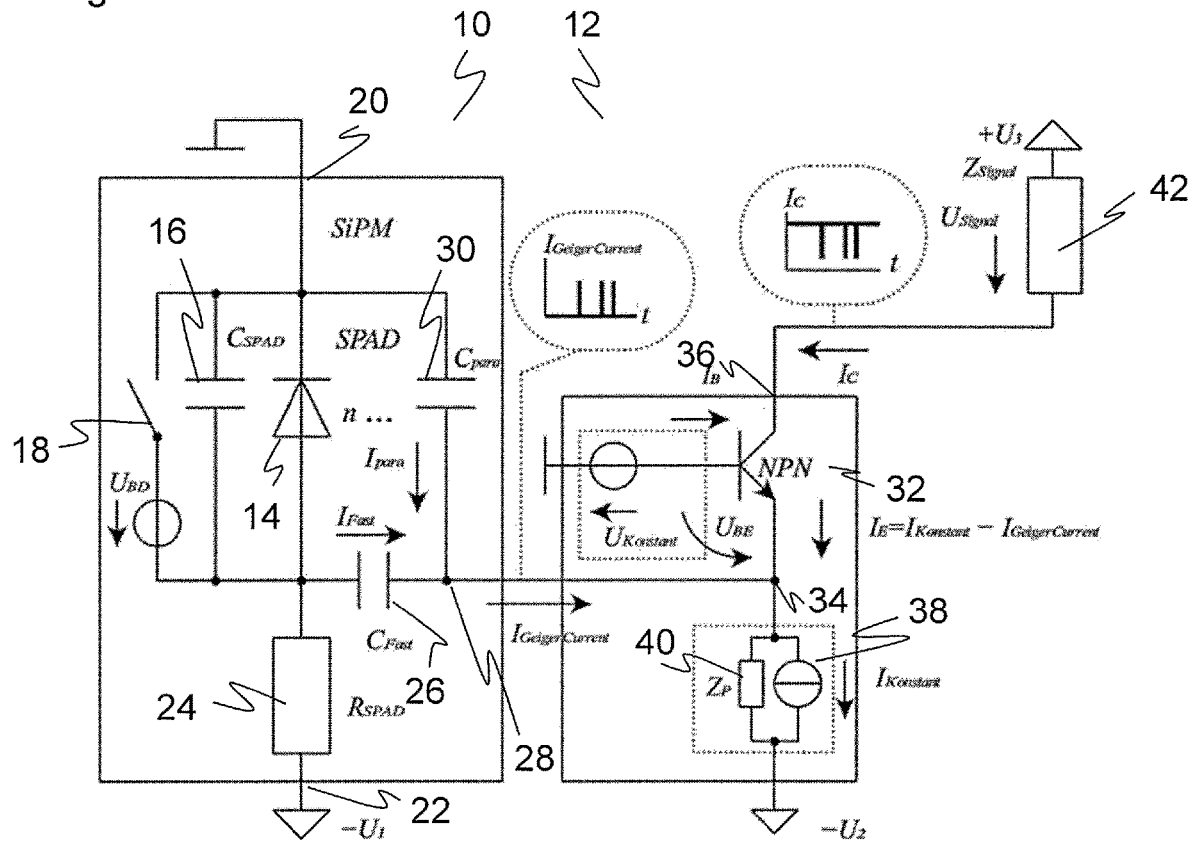

(51) Int. Cl.
*G01S 7/4863* (2020.01)
*G01S 7/481* (2006.01)
*G01S 17/08* (2006.01)
G01J 1/42 (2006.01)
H04B 10/69 (2013.01)
G01S 7/486 (2020.01)
G06K 7/10 (2006.01)
H04B 10/61 (2013.01)
G01S 17/89 (2020.01)

(52) U.S. Cl.
CPC ........ *G06K 7/10851* (2013.01); *H04B 10/616* (2013.01); *H04B 10/691* (2013.01)

(56) References Cited

FOREIGN PATENT DOCUMENTS

| WO | 2009/022166 A2 | 2/2009 |
| WO | 2011/117309 A2 | 9/2011 |
| WO | 2016/099617 A1 | 6/2016 |
| WO | 2016/166002 A1 | 10/2016 |

OTHER PUBLICATIONS

A.Sadigov, et al. "A new detector concept for silicon photomultipliers", Nuclear Instruments and Methods in Physics Research A, 2016, pp. 135-136.

European Search Report dated Jun. 28, 2017 in corresponding European Search Report No. 16206060.02.

\* cited by examiner

Figur 11

LIGHT RECEIVER AND METHOD FOR READING OUT AVALANCHE PHOTODIODES IN GEIGER MODE

The invention relates to a light receiver having a plurality of avalanche photodiode elements operated in a Geiger mode, and to a readout method.

The function of a light receiver is to generate an electrical signal from incident reception light. The detection sensitivity of simple photodiodes is not sufficient in many applications. In an avalanche photodiode (APD), the incident light triggers a controlled avalanche breakdown (avalanche effect). This multiplies the charge carriers generated by incident photons, and a photo current is produced, which is proportional to the light reception level, but significantly larger than in a simple PIN diode. In a so-called Geiger mode, the avalanche photodiode is biased above the breakdown voltage so that even a single charge carrier generated by a single photon can trigger an avalanche, which subsequently recruits all available charge carriers due to the strong field. Hence, the avalanche diode counts individual events like a Geiger counter from which the name is derived. Geiger mode avalanche photodiodes are also called SPAD (Single Photon Avalanche Diode).

The high radiation sensitivity of SPADs is used in a number of applications. These include medical technology like CT, MRI, or blood tests, optical measuring technology like spectroscopy, distance measurement and three-dimensional imaging, radiation detection in nuclear physics, or uses in telescopes for astrophysics.

Geiger APDs or SPADs thus are very fast, highly sensitive photodiodes on a semiconductor basis. One drawback of the high sensitivity is that not only a measurement photon, but also a weak interference event from ambient light, optical cross talk or dark noise may trigger the avalanche breakdown. The interference event contributes to the measurement signal with the same relatively strong signal as the received measurement light and is indistinguishable within the signal. The avalanche diode subsequently is insensitive for a dead time of about 5 to 100 ns and is unavailable for further measurements during that time. It is therefore common to interconnect and statistically evaluate multiple SPADs.

In order to actually make use of the signal, it has to be tapped or read out from the SPAD detector element. However, conventional readout circuits are slow, thus unable to process high frequency signals. Moreover, in many known applications the signals of the SPADs are simply combined. This makes it impossible to associate the respective light reception with the triggering SPADs.

WO 2011/117309 A2 proposes to provide a third electrode on the SPAD detector in addition to the anode and cathode for the providing the bias voltage, the third electrode being used for a capacitively coupled output of the Geiger current. This is to prevent that the readout is delayed by switching elements of the bias voltage. However, the document does not deal with the actual readout.

It is therefore an object of the invention to improve the readout of a plurality of avalanche photodiodes.

This object is satisfied by a light receiver which comprises a plurality of avalanche photodiode elements each being biased with a bias voltage above a breakdown voltage and thus operated in a Geiger mode in order to trigger a Geiger current upon light reception and a plurality of readout circuits associated with individual avalanche photodiode elements or a group of avalanche photodiode elements for reading out a Geiger current generated upon light reception, wherein the readout circuits each comprise a measurement path and a blanking path as well as a switching element, in particular a readout transistor, for selectively supplying or directing the Geiger current, or a measurement current corresponding to the Geiger current, to the measurement path or the blanking path.

The object is also satisfied by a method for reading out avalanche photodiode elements, each being biased with a bias voltage above a breakdown voltage and thus operated in a Geiger mode, wherein the avalanche photodiode elements trigger a Geiger current upon light reception and wherein the Geiger current from individual avalanche photodiode elements or groups of avalanche photodiode elements is read out, and wherein the Geiger current, or a measurement current corresponding to the Geiger current, is selectively supplied or directed to a measurement path or to a blanking path by switching a switching element.

The avalanche photodiode elements are divided into at least two groups, possibly also numerous small groups or even individual avalanche photodiode elements. A readout circuit is assigned to each group or even to each avalanche photodiode element in order to read out the Geiger current. The invention starts from the basic idea of providing a switching in the readout circuits in order to treat the associated avalanche diode elements differently. The Geiger current or a measurement current corresponding to the Geiger current can therefore be supplied either to a measurement path or a blanking path. Thus, kind of an electronic aperture can be generated, which in analogy to an optical aperture switches certain avalanche photodiode elements and thus regions of the light receiver onto the blanking path. As a result, these regions are muted, blanked or masked out, or they are at least evaluated in a different manner than avalanche photodiode elements whose readout circuit connects to the measurement path.

The invention has the advantage that, by using the electronic aperture, reception optics are significantly simplified or even are not present. This results in more degrees of freedom in the arrangement of components of a sensor in which the light receiver is used, and in simplified miniaturization. The tolerance chain is shortened, the compensation of tolerances is simplified, and process reliability is increased.

An electronic aperture can be adjusted by electronic means alone. Mechanical adjustment and components to that end, as well as mechanical means against loss of adjustment, are eliminated. Physical access for an adjustment is not necessary, so that automatization is substantially facilitated. An electronic aperture is able to generate aperture patterns which could be achieved by an optical aperture only with difficulties, if at all. It can be detected, at least in larger classes or groups, which avalanche photodiodes or groups have been triggered by a light signal.

The readout circuit can provide very fast signal detection with extremely short switching times, so that high frequency signals can also be processed. A low voltage level such as 3V technology is sufficient. Integration of avalanche photodiode elements and readout circuit in one semiconductor process is simple and cost-effective. At the same time, the electronic aperture has a lot of applications, and the light receiver can therefore be manufactured in large numbers with low costs.

The blanking path preferably is configured to let the Geiger current or the measurement current be drained without reading out. This is the electronic counterpart to the optical effect of an aperture. Incident light on avalanche photodiode elements whose readout circuits supply the Geiger current or measurement current to the blanking path does not generate a measured signal and thus is practically lost in the electronic aperture.

However, the electronic aperture does not necessarily have this effect. As an alternative, the Geiger current or measurement current in the blanking path can also be measured. This measurement information can, for example, be used to further adapt the electronic aperture, i.e. to switch the readout circuit of some avalanche photodiode elements, or to gain information about the incident signal and e.g. interference light components. In principle, the blanking path can function as a second measurement path and do not have any aperture or blanking effect at all. Throughout this specification, preferably or preferred refers to an advantageous, but completely optional feature.

A signal detection circuit preferably is provided for the readout circuit and the associated individual avalanche photodiode element or the associated group of avalanche photodiode elements, the signal detection circuit comprising an active coupling element having an input connected to the avalanche photodiode elements and an output which maps the Geiger current at the input to the measurement current corresponding to the Geiger current in its course and level, wherein the input forms a virtual short-circuit for the Geiger current to a potential and the output is decoupled from the input. Preferably, there are as many readout circuits as signal detection circuits, which group and assign the existing avalanche photodiode elements in the same way. The readout circuit can in particular be connected directly or indirectly to the avalanche photodiode elements and the signal detection circuit. The signal detection uses an active decoupling method which is highly sensitive and very fast. In this case, the avalanche photodiode element is virtually shorted in terms of AC voltage, so that when the avalanche is triggered, there are only small voltage changes between the connections, so that only very small charges are exchanged between parasitic capacitances of the avalanche photodiode elements which thus have only a small effect on the output signal quality and bandwidth.

This active signal detection is particularly advantageous for the invention and is therefore explained in more detail. The avalanche photodiode elements in the Geiger mode or SPADs practically have the function of highly light-sensitive switches, which trigger a Geiger current upon incidence of light. Conventional means of signal detection are not able to reflect the very fast events in the measurement signal during an avalanche breakdown because of insufficiently optimized circuits. Therefore, the active coupling element is provided, rather than merely passive elements such as a resistor or a transformer. The active coupling element provides at its input a virtual short circuit for the Geiger current against a preferably fixed potential. In practice, this will only be possible down to a few Ohms or fractions of one Ohm. However, this means that the Geiger current is able to almost completely flow out of the detector, i.e. the respective triggering avalanche photodiode element, and via the short circuit into the associated signal detection circuit, quite differently than for example in the case of a simple measurement resistor. Then, the parasitic capacity formed by the plurality of avalanche photodiode elements does not any more have the effect of a low-pass filter, there remains almost no charge exchange. The fast, high-frequency Geiger currents can flow basically completely towards the amplifying element. Furthermore, the coupling element actively generates a measurement current at its output which corresponds to the Geiger current and thus in particular shows the same time profile. The active coupling element can also provide a level of the measurement current suitable for further processing by amplification. At the same time, the measurement current is decoupled from the Geiger current almost completely by the active coupling element. The further processing of the measurement current does not affect the Geiger current. Since the current available during the detection event can flow almost completely into the active coupling element, an optimal gain with a very good signal-to-noise ratio is obtained.

Because of the active coupling element, the course of the measurement current preferably deviates significantly from the Geiger current due to frequency-dependent losses only for changes in the higher gigahertz range, in particular above two or three GHz. Only for frequencies of the incoming light signal above a few GHz, the mapping of the Geiger current to the measurement current shows clearly perceptible frequency-related losses. In contrast, in conventional solutions, the measurement signal drops by several decades even at medium frequencies of several hundred MHz. Thus, the active coupling element enables detection even of very short pulses and edges in the sub-nanosecond range.

The coupling element preferably is configured to maintain a constant level of the input-side voltage. Then, when a Geiger current flows, an output current must flow from the output through the coupling element to maintain the voltage. In this way, the Geiger current at the input is mapped to a corresponding measurement current at the output.

The coupling element preferably comprises a signal detection transistor. In particular, this is exactly one signal detection transistor, and again preferably the coupling element consists of the signal detection transistor. The coupling element therefore is single-stage rather than multi-stage as for example in the case of a transimpedance amplifier conventionally used for readout. The technical nature of the signal detection transistor is not limited and includes bipolar transistors as well as field effect transistors in their different designs. However, a high frequency transistor preferably is used in order to actually achieve the inventive advantages of a high bandwidth of the light receiver.

The signal detection transistor is preferably operated in a base circuit or a gate circuit by connecting the input to the emitter or to the source, the output to the collector or to the drain, and the base or gate to a fixed potential. The terms which are alternatively mentioned in each case relate to a bipolar transistor on the one hand and to a FET on the other, in order to stress that the transistor is not limited to any particular technology. Although, in principle, the much more common emitter circuit would also be conceivable, the base circuit is superior in that it has a low input resistance, a higher bandwidth and flatter frequency characteristics.

The readout circuit preferably is connected to the input. This enables a particularly simple readout circuit which can access the Geiger current of the avalanche photodiode elements.

The readout circuit preferably comprises only one readout transistor. This is a particularly simple readout circuit, which is particularly suitable when a large number of readout circuits are provided for small groups or even individual avalanche photodiode elements. As already explained with respect to the signal detection transistor, a wide variety of technical embodiments are also possible for the readout transistor.

The base voltage of the signal detection transistor or of the readout transistor preferably is adaptable for switching between the measurement path and the blanking path. Depending on where the higher base potential is applied, the other transistor leaves the linear operation range and blocks. Therefore, the base voltage can be used to control whether the Geiger current flows via the signal detection transistor into the signal detection circuit and further into the measurement path, or via the readout transistor into the blanking path. Preferably, the base potential at the signal detection transistor remains constant in order to obtain a measurement without interference, and the adaption of the base potential takes place at the readout transistor.

The readout circuit preferably is connected to the output. In this embodiment, the Geiger current at first flows into the signal detection circuit and there is mapped to the measurement current. The further processing of the measurement current in the readout circuit, and in particular the switching between measurement path and blanking path, does not have any feedback on the Geiger current and the avalanche photodiode elements due to the decoupling in the signal detection circuit, which could not completely be ruled out in the case of a readout circuit connected to the input.

The readout circuit preferably comprises at least two parallel readout transistors each in a cascode circuit with the signal detection transistor. The readout transistors each form a branch point where the measurement path and the blanking path, respectively, begin. The switching is done via the base potential. The measurement current flows via the readout transistor having the higher base potential, with the other readout transistor leaving the linear operation range and blocking. By providing two readout transistors, the blocking voltage requirements of the two readout transistors as well as of the signal detection transistor can be reduced, so that parasitic effects and in particular parasitic capacitances are reduced and further improved high-frequency characteristics are achieved.

The blanking path preferably comprises a measurement tap. Geiger current or measurement current are thus not simply lost, but are also monitored in order to obtain additional measurement information, which can be used for the adaptation of the electronic aperture or even as an additional measuring channel.

The readout circuit comprises at least one further measurement path. In this case, it is not the blanking path which is used as a measurement path, although this is still possible, but a third path is added. In principle, even more measurement paths, i.e. a fourth path and further paths are conceivable, if the increasing complexity of the readout circuit is accepted for this purpose. Preferably, a readout transistor is provided for each measurement path, wherein the selection of the measurement path where the Geiger current or the measurement current flows again takes place via the base potential. Further measurement paths are possible both for embodiments where the readout circuit is connected to the input as well as where it is connected to the output of the signal detection circuit. In an arrangement at the output, there are readout transistors for the blanking path, the measurement path, and the further measurement path. In an arrangement at the input, the transistors of the measurement path and the further measurement path act as readout transistors and as signal detection transistors, and they compete, together with the readout transistor of the blanking path, for the Geiger current via the highest base potential. Application examples for more than one measuring channel are a channel for the actual measurement and a reference channel, a near and a long range, or a division according to wavelengths, in particular when using several transmitters with different wavelengths.

Measurement path and further measurement path preferably each have a measurement tap, the measurement taps having different attenuations of the Geiger current or the measurement current. This is another application example where the further measuring channel is used for signal adaptation in a large dynamic range. For example, the full Geiger current or measurement current is processed in the measurement path, while the further measurement path is attenuated. When an excessive level is detected in the measurement path, the further measurement path can be used, or vice versa in the case of a weak level.

Measurement path and further measurement path preferably comprise a voltage attenuation circuit or different working impedances. These are two possible ways to process stronger and weaker Geiger currents or measurement currents in their own paths.

The avalanche photodiode elements preferably comprise an electrode for providing the Geiger current with capacitive coupling, and wherein the readout circuit is connected to the electrode. The connection is direct or indirect via the intermediate signal detection circuit. The electrode for providing the Geiger current preferably is a third electrode in addition to a first electrode and a second electrode for biasing the avalanche photodiode elements, in order to provide the bias voltage for feeding the avalanche breakdown. By having a third electrode independent of the provision of the bias voltage, a faster readout is possible. The electrode preferably is connected between the avalanche photodiode element and a charging unit for passive quenching and recovery.

Preferably, the input of the signal detection circuit is connected to the third electrode. Thus, the signal detection circuit uses the electrode provided for fast readout. On the other hand, disadvantageous effects of the circuits for biasing on the readout are anyway suppressed by the coupling element according to the invention. Therefore, a fast readout is largely independent of the third electrode, which can thus alternatively not be provided or not be used. The signal detection circuit or the readout circuit, respectively, in this case is connected to the first electrode or the second electrode.

According to another preferred aspect of the invention, there is provided a sensor having at least one light receiver which comprises a plurality of avalanche photodiode elements each being biased with a bias voltage above a breakdown voltage and thus operated in a Geiger mode in order to trigger a Geiger current upon light reception and a plurality of readout circuits associated with individual avalanche photodiode elements or a group of avalanche photodiode elements for reading out a Geiger current generated upon light reception, wherein the readout circuits each comprise a measurement path and a blanking path as well as a switching element, in particular a readout transistor, for selectively supplying or directing the Geiger current, or a measurement current corresponding to the Geiger current, to the measurement path or the blanking path.

The sensor preferably is configured for measuring distances. The distance can be determined by triangulation, as in a triangulating scanning sensor or a stereo camera. Preferably, the distance is measured with a light time of flight method. In a pulse based method, a light transmitter transmits short light pulses, and the time until reception of a remission or reflection of the light pulse is measured. Alternatively, in a phase method, transmission light is modulated in its amplitude, and a phase shift between transmission light and reception light is measured, wherein the phase shift again is a measure for the light time of flight. The light time of flight method can be used in a one-dimensional ranging sensor, a laser scanner or an image sensor of a 3D camera according to the light time of flight method.

The sensor preferably is configured as a code reader or for data transmission, in particular in a data light barrier capable of transmitting and receiving data via the light path which is monitored for objects blocking the light path. These are examples of applications. There are other examples, including sensor implementing combinations of the example applications.

The inventive method can be modified in a similar manner and shows similar advantages. Further advantageous features are described in the sub claims following the independent claims in an exemplary, but non-limiting manner.

Figure 2:
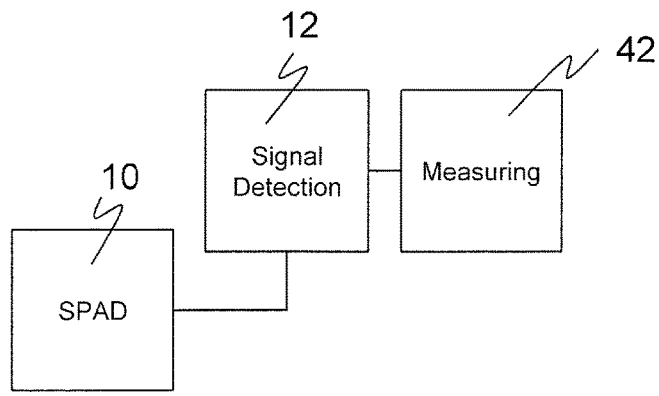
Figure 3:
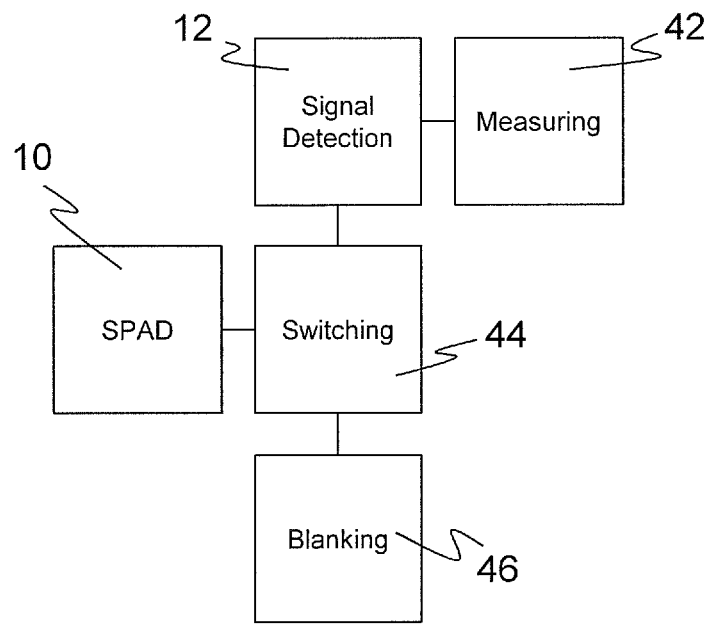
Figure 4:
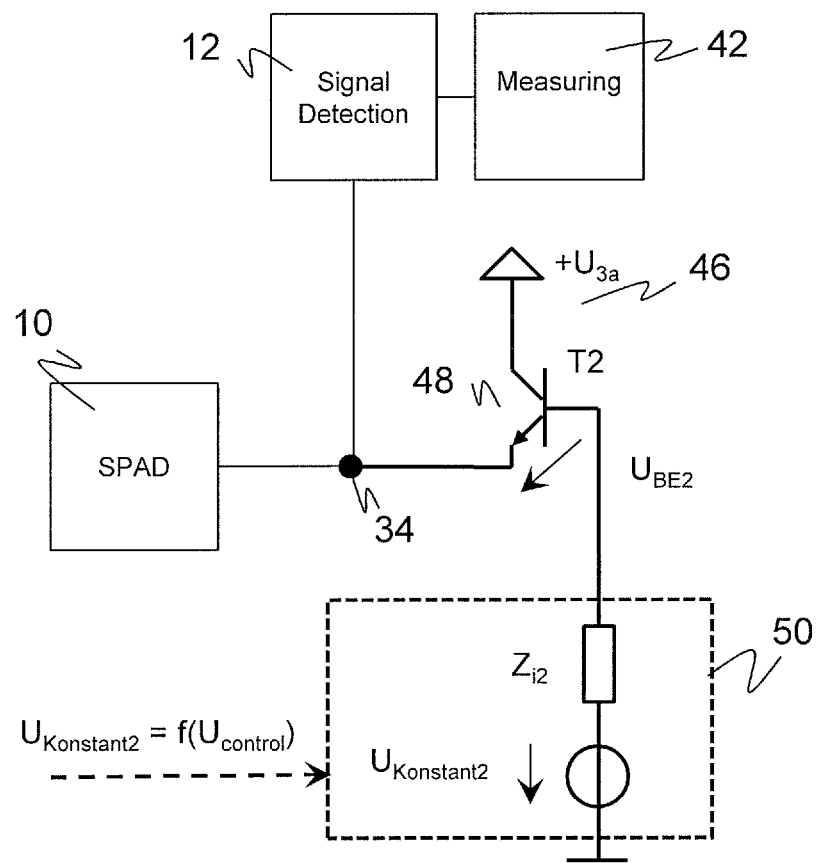
Figure 5:
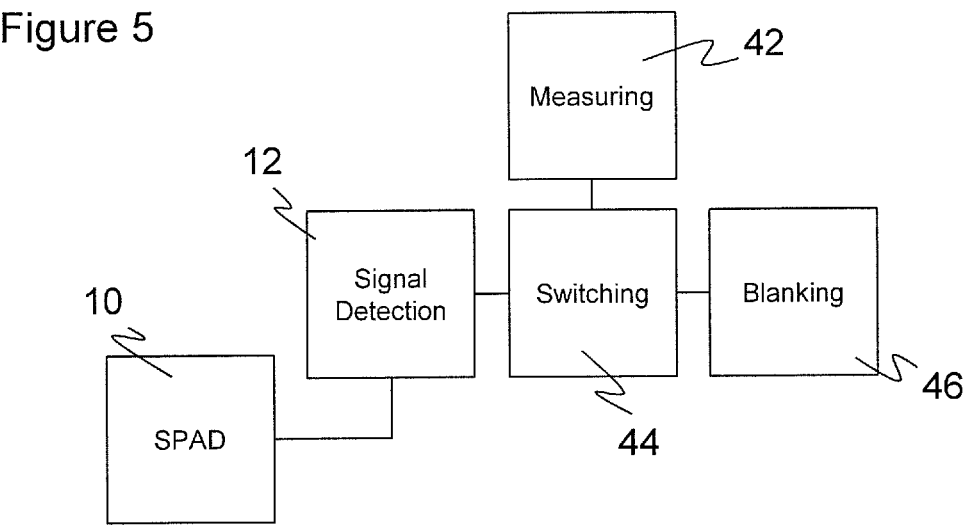
Figure 6:
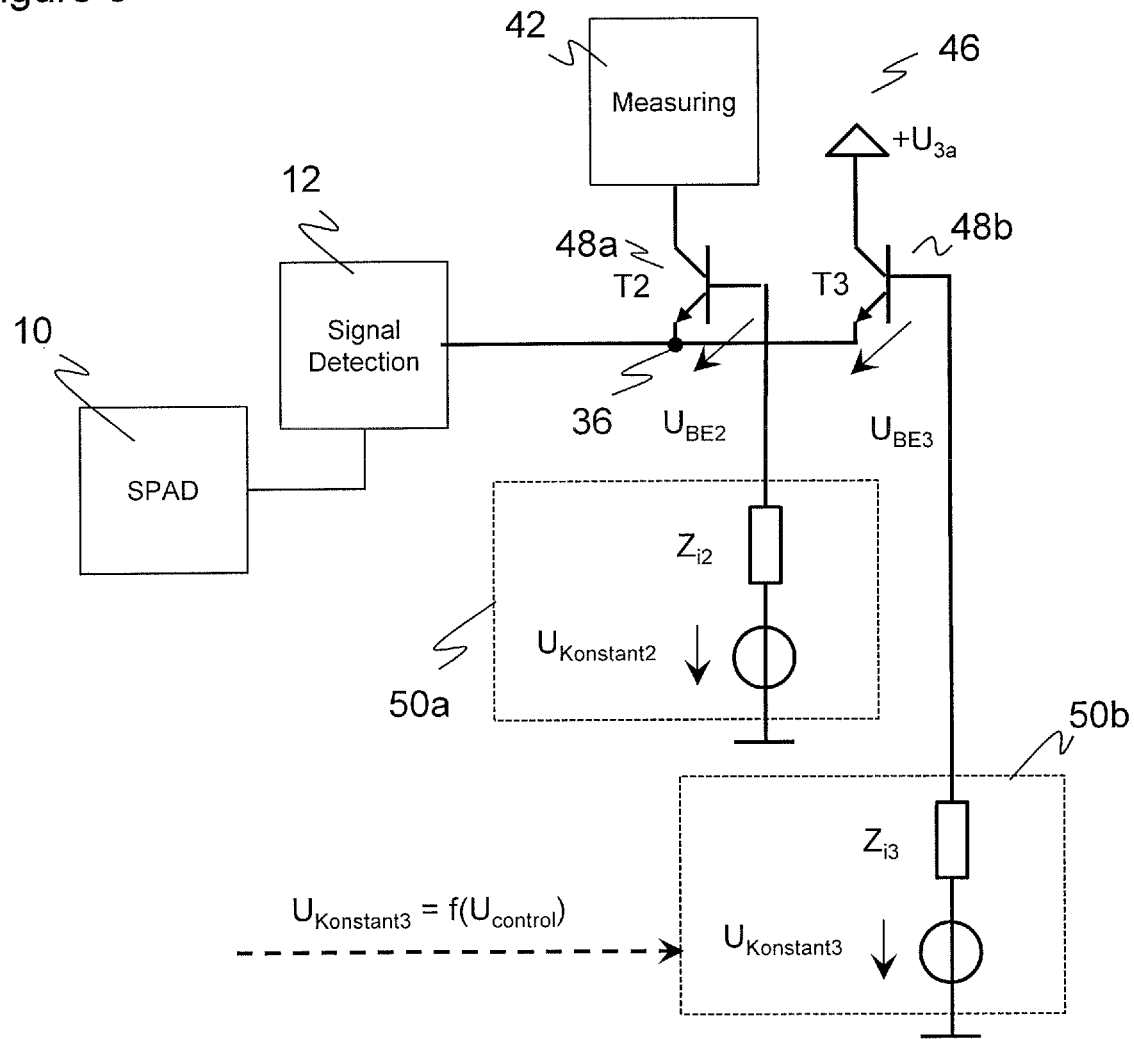
Figure 7:
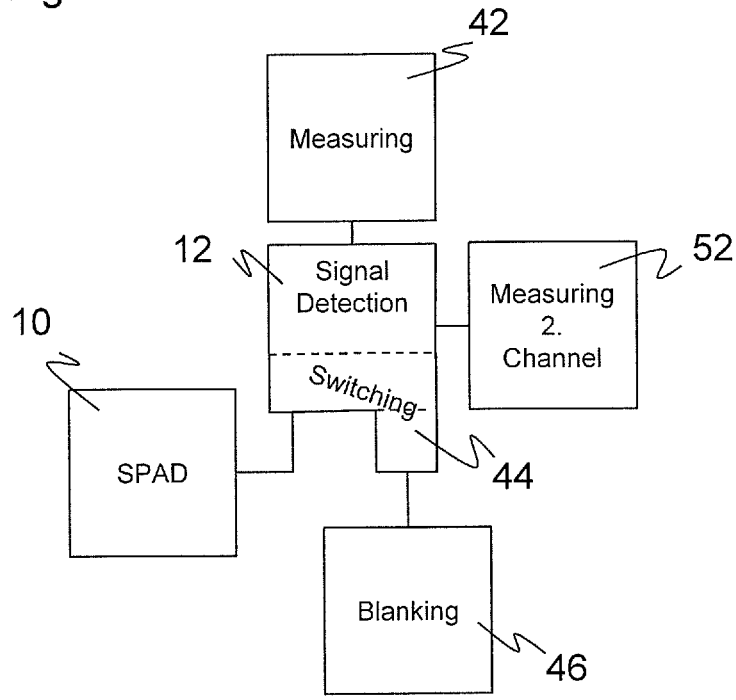
Figure 8:
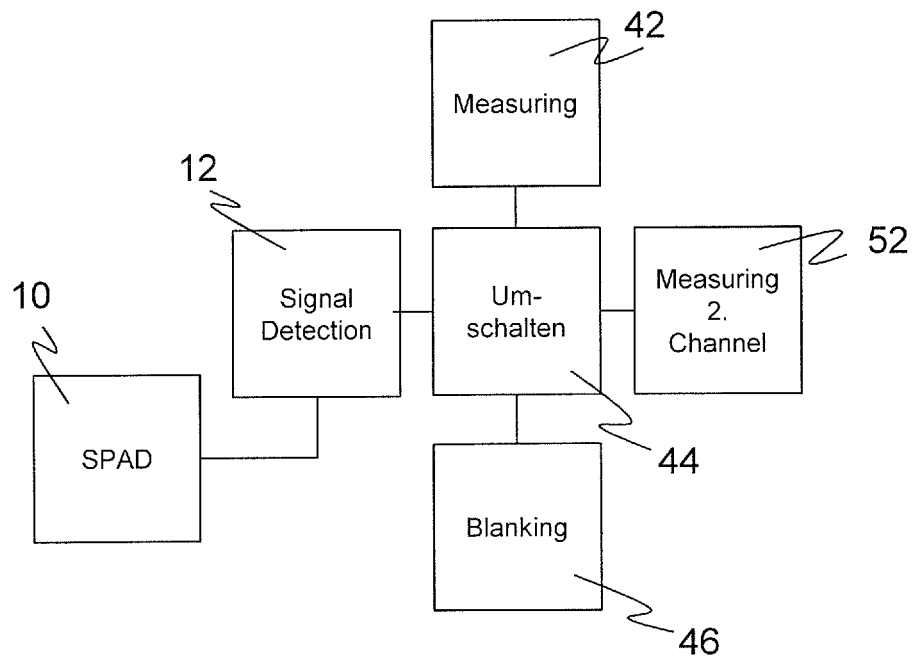
Figure 9:
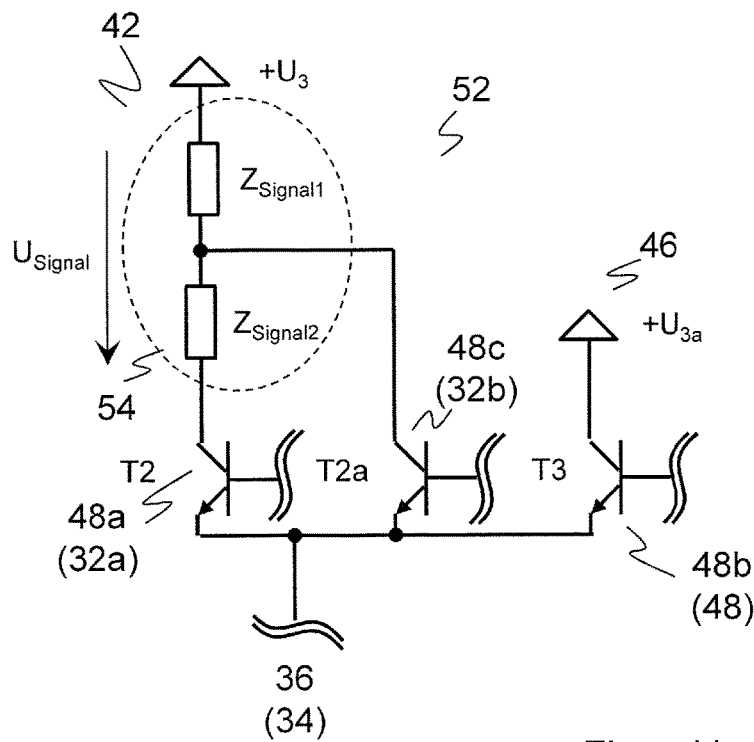
Figure 10:
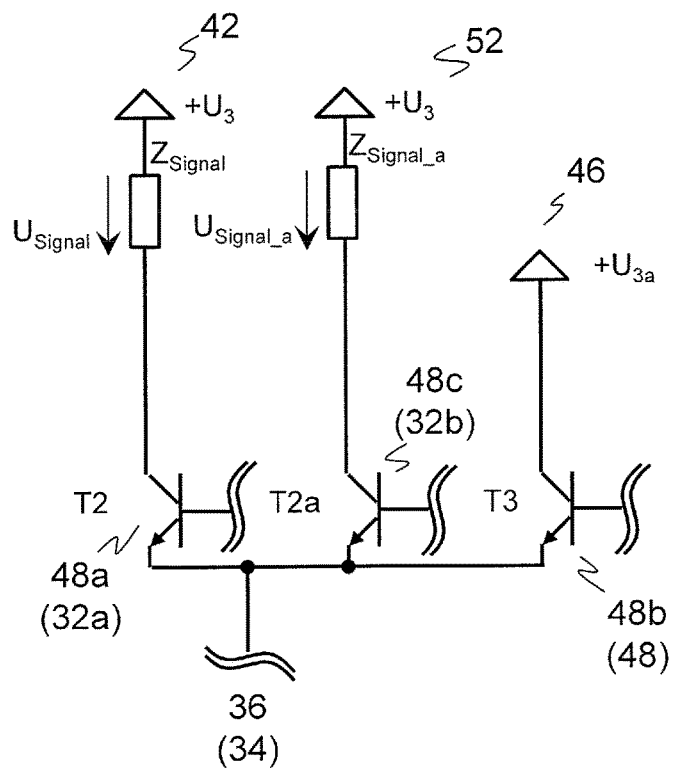
Figure 10:
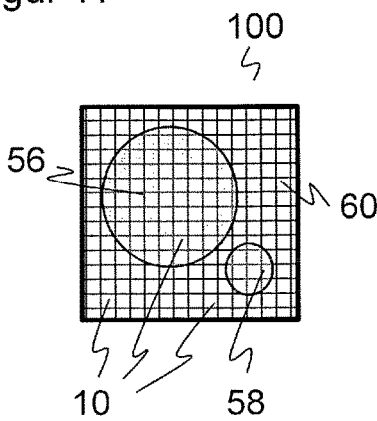

The invention will be explained in the following also with respect to further advantages and features with reference to exemplary embodiments and the enclosed drawing. The Figures of the drawing show in:

FIG. 1 a representation of a signal detection circuit for an avalanche photodiode element having an active coupling element;

FIG. 2 a simplified block diagram corresponding to FIG. 1;

FIG. 3 a block diagram of an embodiment of a readout circuit for selectively switching between a measurement path and a blanking path prior to the signal detection;

FIG. 4 a representation of an exemplary circuitry for the readout circuit according to FIG. 3;

FIG. 5 a block diagram of an embodiment of a readout circuit for selectively switching between a measurement path and a blanking path after the signal detection;

FIG. 6 a representation of an exemplary circuitry for the readout circuit according to FIG. 5;

FIG. 7 a block diagram of an embodiment of a readout circuit having a further measurement path, in the case of switching prior to the signal detection;

FIG. 8 a block diagram of an embodiment of a readout circuit having a further measurement path, in the case of switching after the signal detection;

FIG. 9 a representation of an exemplary circuit arrangement for switching between a measurement path, a further measurement path having an attenuated signal, and a blanking path;

FIG. 10 a representation of an alternative circuit arrangement for switching between a measurement path, a further measurement path having an attenuated signal, and a blanking path; and FIG. 11 an example of a subdivision of the avalanche photodiode elements in a measurement region, a further measurement region, and a blanking region.

FIG. 1 shows, as a starting point, a representation of an avalanche photodiode element 10 with a signal detection circuit 12 which is optimized for sensitivity and bandwidth. The invention in particular relates to a readout circuit which will be explained below with reference to FIGS. 2 to 11. Although this readout circuit can also be used in the case of at least one avalanche photodiode elements 10 without a signal detection circuit 12, the readout circuit preferably is combined with signal detection circuit 12.

The avalanche photodiode element 10 is shown in a simplified circuit diagram. The actual structure of the semiconductor component is assumed to be known and is not shown. A corresponding component can, for example, be produced in a CMOS process. The breakdown voltage of the avalanche photodiode elements 10 is significantly lower than in the case of conventional avalanche photodiodes, for example at most 50 V or 30 V.

On the one hand, the avalanche photodiode element 10 shows the behavior of a diode 14. It also has a capacitance, which is represented by capacitor 16 in parallel connection. An avalanche breakdown is triggered by at least one incident photon, which process acts as a switch 18. In a ready state, there is a voltage above the breakdown voltage across a connector 20 and a connector 22. In case that an incident photon generates a charge carrier pair, this virtually closes the switch 18 so that the avalanche photodiode element 10 is flooded with charge carriers and there flows a so-called Geiger current. However, new charge carriers are generated only as long as the electric field remains strong enough. If the capacitor 16 is discharged far enough so that the voltage becomes lower than the breakdown voltage, the avalanche will automatically run out ("passive quenching"). Thereafter, the capacitor 16 is charged from the connectors 20, 22 via a resistor 24 until the voltage across the diode 14 again exceeds the breakdown voltage. There are alternative configurations in which the avalanche is detected from the outside and then a discharge below the breakdown voltage is triggered ("active quenching").

During the avalanche, the output signal rises rapidly and independently of the intensity of the triggering light to a maximum value and then drops again after the avalanche has been quenched. The time constant of the decay, which corresponds to a dead time of the avalanche photodiode element 10, is typically in the range of several to several tens of nanoseconds. The dead time is not an absolute dead time because, as soon as the bias voltage is large enough to support an avalanche, the output signal can also rise again, although not as much as from the ready state. The gain factor is up to $10^6$ and is essentially the result of the maximum number of charge carriers which can be recruited by the avalanche in the avalanche photodiode element 10.

The task of the signal detection circuit 12 is to obtain a measurement signal from the Geiger current during an avalanche breakdown by utilizing as much of the full current flow as possible, while preserving the high-frequency components and achieving a high signal-to-noise ratio. The signal transfer preferably is done in a capacitive coupling via a coupling capacitor 26. In the shown embodiment, the avalanche photodiode element 10 preferably comprises a separate connector 28 for the readout of a measurement signal, the connector 28 being connected via the coupling capacitor 26. Avalanche photodiode elements 10 not comprising the separate connector 28 are also conceivable. In that case, one of the connectors 20, 22 takes over its function, and preferably a capacitor is connected in parallel to the resistor 24 for improving the high-frequency characteristics.

In a light receiver, a plurality of avalanche photodiode elements 10 preferably is provided. For this purpose, the entire arrangement according to FIG. 1 can be multiplied, i.e. each avalanche photodiode element 10 has its own signal detection circuit 12. Alternatively, avalanche photodiode elements 10 are combined in groups and are commonly read out. From the point of view of the avalanche photodiode element 10 of FIG. 1, these other avalanche photodiode elements, which are not shown, are parasitic capacitances 30, which can be further increased by other parasitic effects. The parasitic capacitance 30 is accumulated over the further avalanche photodiode elements, whose number in typical applications can be large, and can therefore be significantly larger than the capacitance of the associated coupling capacitor 26. The parasitic capacitance 30 has the effect of a low-pass filter blocking high-frequency signals.

The signal detection should have, at the same time, a small signal resistance for achieving high speeds or bandwidths, respectively, and a large resistance for high sensitivity. In order to meet these contradictory requirements, the signal detection circuit 12 uses an active switching solution with an active coupling element 32, which is a bipolar NPN transistor in a base circuit in the embodiment of FIG. 1. Other active elements are conceivable, in particular other transistors (FET), another polarity (PNP) or another circuit (emitter circuit). In addition, a plurality of transistors can also be used instead of a single-stage circuit.

The active coupling element 32 has several significant advantages for the signal detection. Firstly, it provides virtually no resistance for the Geiger current, which is capacitively tapped as a current pulse, i.e. it forms a virtual short circuit. This cannot be achieved completely in practice, but less than one Ohm is quite possible. The effect is that there are no relevant voltage fluctuations across the parasitic capacitance 30 in spite of the avalanche, and thus not charge exchange and no current flow. Therefore, almost the entire Geiger current flowing through the coupling capacitor 26 is available to the active coupling element 32 at the input side. Without the virtual short circuit, a considerable part of the Geiger current would be lost in the parasitic capacitance 30, and especially the fast, high-frequency signal components would be suppressed due to the low pass behavior.

Secondly, the coupling element 32 at its output side generates a measurement current which corresponds to the Geiger current in its temporal course and level. The coupling element 52 may also modify, in particular amplify, the measurement current with respect to the Geiger current by its transfer function in a desired and specified manner. For that purpose, almost the entire current of the avalanche breakdown is available at the coupling element 32. The measurement current is subsequently available at the output side as the detection result for further processing. The measurement current is supplied from a current source of the active coupling element 32 and not from the avalanche photodiode element 10.

Thirdly, input circuit and output circuit are decoupled from one another. The further processing of the measurement current therefore has not impact on the Geiger current, within the technical limits of a real decoupling. Therefore, virtually any successor stages are possible, which in contrast to conventional signal detections do not have unfavorable feedback effects on the Geiger current.

In the specific example of FIG. 1, the emitter of the active coupling element 32 forms the input 34, where the Geiger current is supplied from the connector 28 of the avalanche photodiode element 10. The base is connected to ground or, more generally, to a fixed potential and thus virtually shorted. The collector forms the output 36 where the measurement current is provided. In the emitter circuit of the transistor, there is also a constant current source 38 between input 34 and a supply voltage $-U_2$. Therefore, at times outside avalanche breakdowns, there flows a DC current which controls the operating point of the transistor. The constant current source 38 may alternatively be passively implemented by a resistor 40, or as a combination of both, as shown in FIG. 1. The measurement current is tapped at the output 36. This is done in a measurement path 42, which is shown in a purely exemplary implementation as a simple linear measuring impedance. The measurement path 42 can alternatively comprise any measuring circuits with active and/or passive elements. Due to the decoupling by the signal detection circuit 12, these measuring circuits in the measurement path 42 practically do not affect the actual measurement.

FIG. 2 again shows the circuit arrangement of FIG. 1 for a high-sensitive detector of high bandwidth in a very coarse block diagram, where the avalanche photodiode element 10 indicated by SPAD, the signal detection circuit 12 and the measurement path each are merely represented by a function block. This is intended to facilitate the understanding of the readout circuit to be added, which is now to be explained.

FIG. 3 shows, for a first overview, a block diagram which expands the hitherto single output signal line for a single output signal of the measurement path 42. A switching element 44 is connected to the avalanche photodiode element 10, which selectively directs the Geiger current into a blanking path 46 or, as before, into the measurement path 42 via the signal detection circuit 12. In an application example, the switching element 44 connects a first group of avalanche photodiodes 10 with the blanking path 46 and a second group of avalanche photodiodes 10 with the measurement path 42. In this way, the reception signals of the first group are electronically muted.

FIG. 4 shows a specific circuit example. A readout transistor 48 is connected with its emitter to an input of the signal detection circuit 12. The base potential is adjusted with a controllable voltage source 50. If the base potential at the readout transistor 48 is above the base potential of the transistor 32 of the signal detection circuit 12, its amplification effect is lost, which corresponds to a switch-off of the measurement path 42. The Geiger current is redirected to the readout transistor 48 and is drained via the blanking path 46 (electronic aperture). Conversely, if the base potential is higher at the transistor 32, the Geiger current flows into the signal detection circuit, and the measurement current generated therefrom flows into the measurement path 42.

Since it is the ratio of the base potentials which is relevant, the control can also take place via the transistor 32 of the signal detection circuit 12 as an alternative to controllable voltage source 50. In principle, the blanking path 46 can be configured not only as a pure bypass for draining the Geiger current, but comprise further circuit components in order to gain information about the Geiger current.

The readout circuit according to FIG. 4, which is based on a single readout transistor 48, is particularly simple. This is particularly advantageous in case of reading out avalanche photodiode elements 10 in small groups or even individually, because in that case numerous readout circuits are required.

FIG. 5 shows a further embodiment of the readout circuit, again as a very simplified block diagram for a first overview. In contrast to FIG. 3, the switching element 44 for switching between measurement path 42 and blanking path 46 in this case is arranged downstream the signal detection circuit. The readout circuit therefore is decoupled from the input 34 by the signal detection circuit 12, is not an additional capacitive load or another coupling path for interference. Switching of the switching element 44 is virtually without feedback, because the input 34 is actively maintained at a constant potential by the transistor 32.

However, this robustness requires a somewhat more complex circuitry as compared to FIG. 4 and shown as an example in FIG. 6. Now, two readout transistors 48a-b are provided, which are connected to the transistor 32 of the signal detection circuit 12 in parallel and each in a cascode arrangement. On the collector side, the measurement path 42 is connected to the first readout transistor 42a, and the blanking path 46 is connected to the second readout transistor 48b. A measurement current directed to the measurement path 42, for example, is detected in a measuring termination, while a measurement current in the blanking path 46, in accordance with an electronic aperture, does not contribute to the measurement result. However, as already mentioned, the blanking path 46 is not necessarily a pure bypass where the measurement current is drained and thus lost, but information on the measurement current could also be detected in the blanking path 46, if required.

Now, the measuring current, i.e. the collector current of the transistor 32 which is determined by the Geiger current, is selectively directed to the measurement path 42 or the blanking path 46 by the first readout transistor 48a or the second readout transistor 48b, respectively. This depends on which of the readout transistors 48a-b has the higher base potential, where purely as an example in the case of FIG. 6 the first readout transistor 48a has a constant voltage source 50a and the control takes place via a controllable voltage source 50b of the second readout transistor 48b. The voltage sources 50a-b could also be connected in reverse order, or both could be configured controllable.

The cascode circuit according to FIG. 6 does not only improve the decoupling to the avalanche photodiode element 10 via the signal detection circuit 12, but also again improves the high frequency characteristics, because the voltage requirements of the two readout transistors 48a-b can be reduced, which in turn further reduces parasitic variables and in particular capacitances.

The respective cascode can, as an alternative to the representation, also be implemented as a combination of a bipolar transistor and a FET transistor or as two FET transistors. In principle, a cascode is even possible without a readout circuit having two readout transistors 48a-b and only in connection with a signal detection circuit 12. This would be an example of an alternative embodiment of measurement path 42 in FIG. 1, where the simple measurement resistor is replaced by an active circuit.

The decision between the two embodiments having a readout circuit which is connected either to the input 34 of the signal detection circuit 12 as in FIGS. 3 and 4 or to the output 36 as in FIGS. 5 and 6, using the decoupling, can be based on criteria such as performance, complexity and costs. Both embodiments have in common that there is a kind of digital electronic aperture when the Geiger current or measurement current is drained in the blanking path 46 without any detection. With specific shifts of the operating point by controlling the base potential, the transistors 32, 48, 48a-b are shifted from a linear operation to a blocking operation, and this selects either the measurement path 42 or the blanking path 46. These processes can be very fast via a 3V technology. The small coupling impedance near a short circuit of the signal detection circuit 12 at its input 36 is maintained in the blanking state, i.e. while it is switched to the blanking path 46.

In the previous embodiments, the switching has been limited to a measurement path 42 and a blanking path 46. FIG. 7 shows an embodiment where a further measurement path 52 is added, once again as a very simplified block diagram for a first overview. Here, as in FIG. 3, the switching element 44 is connected to the input 34 of the signal detection circuit 12. In this case, there is no clear distinction between switching element 44 and signal detection circuit 12. Rather, some components are part of both the signal detection circuit 12 and the switching element 44.

FIG. 8 also shows an alternative embodiment having a further measurement path 52 as a simplified block diagram, where in contrast to FIG. 7 the switching element 44 is arranged downstream the signal detection circuit 12 and is connected to its output 36.

FIG. 9 shows an exemplary circuit arrangement for switching also to a further measurement path 52. This circuit can be used both for connecting to the output 36 and to the input 34 of the signal detection circuit 12. This alters the names and reference symbols of the transistors, which is represented by reference symbols in brackets. When connected to the output 36, another readout transistor 48c for the further measurement path 52 is added in addition to the readout transistors 48a—for the measurement path 42 and the blanking path 46, respectively. When connected to the input 34, the signal detection circuit 12 already comprises two transistors 32a-b instead of the transistor 32, so that a measurement current can be directed to the measurement path 42 and the further measurement path 52, and the separate readout transistor 48 for the blanking path 46 is retained.

In both cases, all the common emitter points of the three transistors are located at a common node 34, 36, and the further explanations can be made in common, while reference symbols for an embodiment with a connection at the output 36 are used, but could be replaced with those of an embodiment with a connection at the input 34. As in previous embodiments, it is switched by placing one of the transistors 48a-c at a higher base potential, whereupon the other transistors 48a-c shift from linear operation to blocking operation. The base control of the transistors 48a-c corresponds to previous Figures and is not shown to simplify the representation. It is switched between three states, where the Geiger current or the measurement current is selectively directed to the measurement path 42, the blanking path 46, or the further measurement path 52 in each case on the collector side.

FIG. 9 in addition shows an exemplary circuit within the measurement path 42 and the further measurement path 52, which example is independent from having the further measurement path 52 in the first place. An attenuator circuit 54 having two individual impedances $Z_{Signal1}$ and $Z_{Signal2}$ is provided. The measuring tap is on the collector of the transistor 48a (T2). The collector-side entry point of the third readout transistor 48c for the further measurement path 52 is between the two individual impedances $Z_{Signal1}$ and $Z_{Signal2}$. The signal in the further measurement path 52 is thus attenuated with respect to the measurement path 42 by the ratio of the two individual impedances $Z_{Signal1}$ and $Z_{Signal2}$. In the event of a signal which is too strong or too weak, it can be switched between measurement path 42 and further measurement path 52. However, saturation already on the level of the upstream avalanche photodiode elements 10 cannot be prevented in this way. The muting in the blanking path 46 upon activating the second readout transistor 48b is the same as before. By including a third measurement path or even more measurement paths, a further graduation of the attenuation is possible.

FIG. 10 shows an alternative exemplary circuit having a further measurement path 52. In contrast to FIG. 9, no attenuation circuit is provided. Instead, different impedances in the measurement path 42 and the further measurement path 52 can be used for the measuring tap, and thus different sensitivities can be set. In addition, the detected signals in the measurement path 42 and the further measurement path 52 can be assigned to separate channels for further processing.

A possible application for the further measurement path 52 for signal attenuation or a graded sensitivity, respectively, has already been described. However, a multi-channel light receiver can be used in various other ways. Examples are a measurement channel and a reference channel, a near range and a far range, or two color channels, where the term color is not limited to the visible spectrum.

FIG. 11 shows an exemplary subdivision of a light receiver 100 having a plurality of avalanche photodiode elements 10 arranged in a matrix. Three groups are formed, which assign, in the order given, avalanche photodiode elements 10 at expected positions of a large light spot 56, for example in the near range or as a measurement region, a small light spot 58, for example in the far range or as a reference region, and a remaining region 60 to the measurement path 42, the further measurement path 52, and the blanking path 46. One advantage of the electronic aperture, muting the remaining region 60 where there is no light and which is thus not used, is an increased robustness against ambient or interference light. A subdivision into further regions is possible with additional channels, i.e. paths analogous to the further measurement path 52. This refers to a real separation into further classes. Of course, it is possible to form a region from a plurality of non-contiguous regions on the light receiver 100 while using only one respective path 42, 46, 52.

In all representations, the blanking path 46 is only used to drain the Geiger current or measurement current, by a direct collector-side connection to the supply voltage, without evaluation. However, deviating from previous representations and nowhere shown, a measuring tap can also be provided in the blanking path 46, for example a measuring impedance. Thereby, additional signal information is obtained, in particular the quantity of light which is blocked in the blanking path 46.

The invention has been described with reference to specific embodiments. This is exemplary and non-limiting, where only a few specific possible modifications are mentioned below. For example, an identical circuitry is described for all avalanche photodiode elements 10, which although less complex in terms of manufacture and application is actually not necessary. All voltage and reference potentials as shown and discussed can be shifted or inversed. The transistor polarities can be altered, such as PNP instead of NPN, and FET or MOSFET transistors can be used instead of bipolar transistors.

The invention claimed is:

1. A light receiver (100), comprising:
   a plurality of avalanche photodiode elements (10) each being biased with a bias voltage above a breakdown voltage and thus operated in a Geiger mode in order to trigger a Geiger current upon light reception; and
   a plurality of readout circuits (42, 44, 46) associated with individual avalanche photodiode elements (10) or a group of avalanche photodiode elements (10) for reading out a Geiger current generated upon light reception,
   wherein the readout circuits (42, 44, 46) each comprise a measurement path (42) and a blanking path (46) as well as a switching element (44) for selectively supplying the Geiger current, or a measurement current corresponding to the Geiger current, to the measurement path (42) or the blanking path (46) to switch regions of the light receiver (100) to the blanking path (46), such that the regions are muted or at least evaluated in a different manner than the avalanche photodiode elements (10), the readout circuits (42, 44, 46) thereof being connected to the measurement path (42).

2. The light receiver (100) according to claim 1,
   wherein the switching element (44) is a readout transistor (48).

3. The light receiver (100) according to claim 1,
   wherein the blanking path (46) is configured to let the Geiger current or the measurement current be drained without reading out.

4. The light receiver (100) according to claim 1,
   wherein a signal detection circuit (12) is provided for the readout circuit (42, 44, 46) and the associated individual avalanche photodiode element (10) or the associated group of avalanche photodiode elements (10), the signal detection circuit (12) comprising an active coupling element (32) having an input (34) connected to the avalanche photodiode elements (10) and an output (36) which maps the Geiger current at the input (34) to the measurement current corresponding to the Geiger current in its course and level, wherein the input (34) forms a virtual short-circuit for the Geiger current to a potential (ground; $-U_{BE}$; $U_{const}-U_{BE}$) and the output (36) is decoupled from the input (34).

5. The light receiver (100) according to claim 4,
   wherein the coupling element (32) comprises one signal detection transistor.

6. The light receiver (100) according to claim 5,
   wherein the base voltage of the signal detection transistor is adaptable for switching between the measurement path (42) and the blanking path (46).

7. The light receiver (100) according to claim 4,
   wherein the readout circuit (42, 44, 46) is connected to the input (34).

8. The light receiver (100) according to claim 7,
   wherein the readout circuit (42, 44, 46) comprises only one readout transistor (48).

9. The light receiver (100) according to claim 8,
   wherein the base voltage of the readout transistor (48) is adaptable for switching between the measurement path (42) and the blanking path (46).

10. The light receiver (100) according to claim 4,
    wherein the readout circuit (42, 44, 46) is connected to the output (36).

11. The light receiver (100) according to claim 10,
    wherein the coupling element (32) comprises a signal detection transistor, and wherein the readout circuit (42, 44, 46) comprises at least two parallel readout transistors (48*a-b*) each in a cascode circuit with the signal detection transistor.

12. The light receiver (100) according to claim 1,
    wherein the blanking path (46) comprises a measurement tap.

13. The light receiver (100) according to claim 1,
    wherein the readout circuit (42, 44, 46) comprises at least one further measurement path (52).

14. The light receiver (100) according to claim 13,
    wherein measurement path (42) and further measurement path (52) each have a measurement tap, the measurement taps having different attenuations of the Geiger current or the measurement current.

15. The light receiver (100) according to claim 14,
    wherein measurement path (42) and further measurement path (52) comprise a voltage attenuation circuit or different working impedances.

16. The light receiver (100) according to claim 1,
    wherein the avalanche photodiode elements (10) comprise an electrode (28) for providing the Geiger current with capacitive coupling, and wherein the readout circuit (42, 44, 46) is connected to the electrode (28).

17. An optoelectronic sensor having at least one light receiver (100), the light receiver (100) comprising:
    a plurality of avalanche photodiode elements (10) each being biased with a bias voltage above a breakdown voltage and thus operated in a Geiger mode in order to trigger a Geiger current upon light reception; and
    a plurality of readout circuits (42, 44, 46) associated with individual avalanche photodiode elements (10) or a group of avalanche photodiode elements (10) for reading out a Geiger current generated upon light reception, wherein the readout circuits (42, 44, 46) each comprise a measurement path (42) and a blanking path (46) as well as a switching element (44) for selectively supplying the Geiger current, or a measurement current corresponding to the Geiger current, to the measurement path (42) or the blanking path (46) to switch regions of the light receiver (100) to the blanking path (46), such that the regions are muted or at least evaluated in a different manner than the avalanche photodiode elements (10), the readout circuits (42, 44, 46) thereof being connected to the measurement path (42).

18. The optoelectronic sensor according to claim 17, the sensor being configured as a sensor for measuring distances according to a time of flight method.

19. The optoelectronic sensor according to claim 17, the sensor being configured as a code reader.

20. The optoelectronic sensor according to claim 17, the sensor being configured for data transmission.

21. A method for reading out avalanche photodiode elements (10), each being biased with a bias voltage above a breakdown voltage and thus operated in a Geiger mode, wherein the avalanche photodiode elements (10) trigger a Geiger current upon light reception and wherein the Geiger current from individual avalanche photodiode elements (10) or groups of avalanche photodiode elements (10) is read out, and wherein the Geiger current, or a measurement current corresponding to the Geiger current, is selectively supplied to a measurement path (42) or to a blanking path (46) by switching a switching element (44) to switch regions of a light receiver (100) to the blanking path (46), such that the regions are muted or at least evaluated in a different manner than the avalanche photodiode elements (10), readout circuits (42, 44, 46) thereof being connected to the measurement path (42).

* * * * *